US009695906B2

(12) United States Patent
Brocke et al.

(10) Patent No.: US 9,695,906 B2
(45) Date of Patent: Jul. 4, 2017

(54) METHOD FOR FABRICATING A BELT WITH TREATED TENSION MEMBERS WITH ENVELOPE LAYER AND BELT THUS PRODUCED

(71) Applicant: ContiTech Antriebssysteme GmbH, Hannover (DE)

(72) Inventors: Stephan Brocke, Hamburg (DE); Hubert Goeser, Dannenberg (DE); Andre Kucharczyk, Guelden (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 33 days.

(21) Appl. No.: 14/932,551

(22) Filed: Nov. 4, 2015

(65) Prior Publication Data
US 2016/0053850 A1 Feb. 25, 2016

Related U.S. Application Data

(63) Continuation of application No. PCT/EP2014/053897, filed on Feb. 28, 2014.

(30) Foreign Application Priority Data

May 8, 2013 (DE) ........................ 10 2013 104 757

(51) Int. Cl.
*F16G 1/00* (2006.01)
*F16G 5/00* (2006.01)
(Continued)

(52) U.S. Cl.
CPC .............. *F16G 1/10* (2013.01); *B29D 29/00* (2013.01); *B29D 29/08* (2013.01); *B29D 29/10* (2013.01);
(Continued)

(58) Field of Classification Search
CPC ..... F16G 1/28; F16G 5/20; F16G 5/06; F16G 1/08; B29D 29/08
(Continued)

(56) References Cited

U.S. PATENT DOCUMENTS 2,653,886 A * 9/1953 Gentle ....................... C08J 5/06
156/180
3,981,206 A * 9/1976 Miranti, Jr. .......... B29D 29/103
474/238
(Continued)

FOREIGN PATENT DOCUMENTS

CN          1566247 A     1/2005
DE       38 23 157 A1     2/1990
(Continued)

OTHER PUBLICATIONS

International Search Report dated May 16, 2014 of international application PCT/EP2014/053897 on which this application is based.

*Primary Examiner* — Henry Liu
(74) *Attorney, Agent, or Firm* — Walter Ottesen, P.A.

(57) ABSTRACT

A method for fabricating a belt with upstream treatment of a tension member. The belt comprises a belt body made of a polymeric material having elastic properties, having a top ply as belt backing and a substructure having a force transmission zone, and a tension member embedded into the belt body. The tension member has been treated with crosslinked polymer; in an upstream stage of the belt fabrication method, voids in the tension member are filled at least partly with crosslinked polymer and the tension member is sealed with an envelope layer of crosslinked polymer, this being done, in a single treatment stage or in at least two treatment stages, by wetting of the tension member with an overall treatment mixture comprising at least one prepolymer, at
(Continued)

least one crosslinker and at least one solvent or dispersion medium, and then drying of the treated tension member.

18 Claims, 1 Drawing Sheet

(51) Int. Cl.

| | |
|---|---|
| F16G 9/00 | (2006.01) |
| F16G 1/10 | (2006.01) |
| B29D 29/08 | (2006.01) |
| F16G 1/28 | (2006.01) |
| F16G 5/08 | (2006.01) |
| F16G 5/20 | (2006.01) |
| B29D 29/00 | (2006.01) |
| B29D 29/10 | (2006.01) |
| D06M 15/564 | (2006.01) |
| B29K 75/00 | (2006.01) |
| B29K 105/08 | (2006.01) |
| B29K 105/24 | (2006.01) |
| B29K 307/04 | (2006.01) |

(52) U.S. Cl.
CPC ............... *F16G 1/28* (2013.01); *F16G 5/08* (2013.01); *F16G 5/20* (2013.01); *B29K 2075/00* (2013.01); *B29K 2105/08* (2013.01); *B29K 2105/246* (2013.01); *B29K 2307/04* (2013.01); *D06M 15/564* (2013.01)

(58) Field of Classification Search
USPC ........................................................ 474/260
See application file for complete search history.

(56) References Cited

U.S. PATENT DOCUMENTS

| | | | | |
|---|---|---|---|---|
| 4,711,792 A * | 12/1987 | Long | ............... | B29B 15/122 427/176 |
| 5,161,677 A * | 11/1992 | Beecher | ............... | B65G 15/36 198/847 |
| 5,417,618 A * | 5/1995 | Osako | ............... | F16G 1/28 474/205 |
| 5,807,194 A * | 9/1998 | Knutson | ............... | B29D 29/08 474/237 |
| 6,358,609 B2 * | 3/2002 | Kinoshita | ............... | B29D 29/08 156/139 |
| 6,491,598 B1 * | 12/2002 | Rosenboom | ............... | B32B 25/14 428/515 |
| 6,695,733 B2 * | 2/2004 | Knutson | ............... | B29D 29/08 156/139 |
| 6,872,159 B2 * | 3/2005 | Knutson | ............... | B29D 29/08 156/137 |
| 6,918,849 B2 * | 7/2005 | Gregg | ............... | F16G 1/08 156/137 |
| 6,945,891 B2 * | 9/2005 | Knutson | ............... | B29D 29/08 156/137 |
| 7,128,674 B2 * | 10/2006 | Teves | ............... | F16G 1/06 474/238 |
| 8,262,523 B2 * | 9/2012 | Kanzow | ............... | D04B 21/18 474/268 |
| 8,357,065 B2 * | 1/2013 | Duke, Jr. | ............... | B29D 29/08 474/205 |
| 2001/0036558 A1 * | 11/2001 | Lewtas | ............... | B32B 27/32 428/521 |
| 2002/0132692 A1 * | 9/2002 | Knutson | ............... | B29D 29/08 474/263 |
| 2003/0130077 A1 * | 7/2003 | Knutson | ............... | B29D 29/08 474/260 |
| 2004/0132571 A1 * | 7/2004 | Knutson | ............... | B29D 29/08 474/260 |
| 2008/0004145 A1 * | 1/2008 | Duke | ............... | B29D 29/08 474/205 |
| 2008/0032837 A1 * | 2/2008 | Unruh | ............... | F16G 1/28 474/143 |
| 2009/0227406 A1 * | 9/2009 | Wu | ............... | C08G 18/12 474/238 |
| 2011/0129647 A1 * | 6/2011 | Duke, Jr. | ............... | C08G 18/10 428/156 |
| 2013/0225346 A1 * | 8/2013 | Gibson | ............... | F16G 1/08 474/260 |
| 2014/0238581 A1 * | 8/2014 | Brocke | ............... | B29D 29/08 156/139 |
| 2014/0243134 A1 * | 8/2014 | Kucharczyk | ............... | F16G 1/16 474/261 |
| 2014/0296010 A1 * | 10/2014 | Yoshida | ............... | B29D 29/103 474/190 |

FOREIGN PATENT DOCUMENTS

| | | |
|---|---|---|
| DE | 10 2007 062 285 A1 | 6/2009 |
| DE | 10 2008 012 044 A1 | 9/2009 |
| DE | 10 2009 044 153 A1 | 4/2011 |
| JP | 2005-248356 A | 9/2005 |
| JP | 2010-276175 A | 12/2010 |
| WO | 2005/080821 A1 | 9/2005 |

\* cited by examiner

METHOD FOR FABRICATING A BELT WITH TREATED TENSION MEMBERS WITH ENVELOPE LAYER AND BELT THUS PRODUCED

CROSS REFERENCE TO RELATED APPLICATIONS

This application is a continuation application of international patent application PCT/EP2014/053897, filed Feb. 28, 2014, designating the United States and claiming priority from German application 10 2013 104 757.2, filed May 8, 2013, and the entire content of both applications is incorporated herein by reference.

FIELD OF THE INVENTION

The disclosure relates to a process for the manufacture of a belt which comprises a main belt structure made of a polymeric material with elastic properties, comprising an outer layer as belt backing and a substructure with a force-transmission zone, and, embedded in the main belt structure, a tension-member system, and to the belts obtainable via the process.

BACKGROUND OF THE INVENTION

Belts of the abovementioned type are of exceptional importance in particular in drive engineering. These belts are also termed drive belts or force-transmission belts, and can be flat belts, V-belts, V-ribbed belts, toothed belts, or composite cables. The force-transmission zone here provides the belt-drive function. Patent literature to which reference is in particular made in this connection is: DE 38 23 157 A1, U.S. Pat. Nos. 7,128,674, 8,262,523, DE 10 2007 062 285 A1, DE 10 2008 012 044 A1, DE 10 2009 044 153 A1, U.S. Pat. No. 5,807,194, WO 2005/080821 A1, United States patent application publication 2008/0032837, United States patent application publication 2011/0129647, U.S. Pat. Nos. 3,981,206, 5,417,618, and 6,491,598.

It is moreover known that belts can be used to convey materials, other terms used for belts of this type being transport belts or conveyor belts. The outer layer, as belt backing, then provides the outer surface on the loadbearing side for the material to be conveyed. The substructure is then the outer surface in contact with a drive drum on the drive side.

The elasticity of a belt is achieved in that the main belt structure, and therefore the outer layer and the substructure, are composed of a polymeric material with elastic properties, particular groups of materials that may be mentioned here being elastomers and thermoplastic elastomers.

Materials of particular importance are elastomers based on a crosslinked rubber mixture comprising at least one rubber component and mixture ingredients. A particular rubber component used is ethylene-propylene rubber (EPM), ethylene-propylene-diene rubber (EPDM), hydrogenated or partially hydrogenated nitrile rubber (HNBR), fluororubber (FKM), natural rubber (NR), chloroprene rubber (CR), styrene-butadiene rubber (SBR), butadiene rubber (BR), or polyurethane (PU), these being unblended or blended with at least one other rubber component, in particular with one of the abovementioned types of rubber, for example in the form of an EPM/EPDM or SBR/BR blend. A material of particular importance here is HNBR, EPM, EPDM, PU or an EPM/EPDM blend. The mixture ingredients comprise at least one crosslinking agent or one crosslinking agent system (crosslinking agent and accelerator). Other mixture ingredients are mostly a filler and/or a processing aid, and/or a plasticizer and/or an ageing inhibitor, and also optionally other additional substances, for example fibers for reinforcement purposes, and color pigments. Reference is made in this connection to the general prior art in rubber mixture technology.

The belt has an embedded tension-member system composed of at least one tension member running in the longitudinal direction of the belt. There are mostly a plurality of tension members forming a tension-member-system layer. A tension member composed of a cord structure is of particular importance here, and in this connection the prior art provides configurations using various materials. The significant types of materials are: steel, polyamide (PA), aramid, polyester, carbon, basalt, polyetheretherketone (PEEK), polyethylene terephthalate (PET), polybenzoxazole (PBO), and polyethylene 2,6-naphthalate (PEN).

In particular the force-transmission zone of a belt for drive engineering is provided with an abrasion-resistant coating which also serves for noise reduction and can moreover also be oil-resistant. A flock overlay, in particular in the form of a cotton flock or aramid flock, can be used here, or a thin elastic polymer layer filled with fibers (for example, aramid fibers), a textile overlay, in particular in the form of a woven or knitted fabric, or a film (for example, PTFE film), or a film composite (for example, PA-PTFE film). Woven fabric is of particular importance. The coatings mentioned here are mostly treated to promote adhesion, for example with a resorcinol-formaldehyde latex (RFL), on the side in contact with the main belt structure, in particular the side in contact with the substructure thereof.

The prior art for the treatment of the tension-member system is now described in more detail below.

U.S. Pat. No. 5,807,194 presents a toothed belt in which the main belt structure is composed of a cast polyurethane. The embedded tension-member system composed of a cord structure is composed of carbon fibers, the cord being subjected to a particular process. When the belt is cast, only a portion of the cavities in the tension-member system are filled with the polyurethane casting composition. It is disadvantageous that a precondition of this type of treatment of the tension-member system with polyurethane is that the main belt structure is likewise composed of a polyurethane of identical composition. No attention is therefore given to the different properties of the carbon tension-member system and of the main belt structure.

United States patent application publication 2011/0129647 describes a belt, the tension-member system of which is composed of a cord structure and has been treated with a crosslinked polyurethane. The degree of filling of the cavities in the tension-member system with the crosslinked polyurethane is preferably from 20% to 100%. A polyurethane prepolymer is formed by selecting polyols from polyester polyols, polycarbonate polyols, and polyether polyols as component A and reacting these with diisocyanates as component B. The resultant polyurethane prepolymer can then be crosslinked with a diamine and/or with water, in particular with water.

United States patent application publication 2011/0129647 also presents a treatment process for the tension-member system which is an upstream stage, specifically being what is known as a "two-bath method". The tension-member system here is impregnated with a mixture of a polyurethane prepolymer and an inert solvent/dispersion medium, whereupon the cavities in the tension-member system are at least to some extent filled with the mixture.

This is followed by a drying procedure. Crosslinking with water then takes place. The belt is then produced with the tension-member system thus treated.

During the handling and processing of tension-member systems it is possible that individual filaments separate from the tension-member system, with resultant impairment of the mechanical properties of the tension-member system. In the case of tension-member systems made of electrically conductive filaments, for example carbon fibers, there is the additional problem that complicated shielding procedures are required for the machinery used, and protective measures are required for the operators. No satisfactory solution to these problems has yet been found.

SUMMARY OF THE INVENTION

The object of the invention is, with the aim of further development of the teaching of United States patent application publication 2011/0129647 to provide a process which can manufacture a belt with embedded tension-member systems and which permits reproducible polymer-filling of the cavities in the tension-member systems, thus ensuring a high level of process reliability. This process is moreover intended to achieve uniform wetting of all of the fibers in the tension-member systems, even the innermost fibers.

A further intention is to avoid, as far as possible, the separation of individual filaments from the tension-member system during handling and processing. A further intention is that there be no need for any shielding measures for the machinery used, and no need for any measures for the protection of operators, in the case of electrically conductive tension-member systems, such as those made of carbon fibers, for example.

Surprisingly, the object has been achieved via a process for the manufacture of a belt 1 with upstream treatment of a tension-member system 3, where the belt 1:

comprises a main belt structure made of a polymeric material with elastic properties, comprising an outer layer 2 as belt backing and a substructure 4 with a force-transmission zone 7; and, embedded in the main belt structure, a tension-member system 3, where the tension-member system 3 has been treated with crosslinked polymer, where, in the process, in an upstream stage of manufacture of the belt cavities in the tension-member system 3 are at least to some extent filled with crosslinked polymer and the tension-member system 3 is sealed with an encapsulating layer made of crosslinked polymer, in that in a single treatment stage or in at least two treatment stages the tension-member system 3 is wetted with a complete treatment mixture comprising at least one prepolymer, at least one crosslinking agent, and at least one solvent or dispersion medium, and the treated tension-member system 3 is then dried.

The process of the invention seals the tension-member systems, in particular made of carbon fibers, with an encapsulating layer at the surface of the tension-member system, in such a way that in essence there are no uncovered surfaces present. This protects the tension-member system from mechanical effects and avoids separation of the filaments of the tension-member system. Insulation of tension-member systems made of electrically conductive fibers, for example carbon fibers, is moreover achieved in such a way that there is no requirement for the protective measures that are otherwise conventional for the machinery used and for the operators; this significantly reduces production costs.

Longer lifetime is achieved in that all of the fibers in the force-transmission system are bound into the system. Good protection is achieved because even the innermost filaments are wetted. The force-transmission belts produced in the invention achieve very good operating results.

A detailed illustration of the invention is provided below.

The process of the invention can be carried out via the following process variants I and II.

In an upstream stage of belt manufacture in process variant I, cavities in the tension-member system 3 are at least to some extent filled with crosslinked polymer, and the tension-member system 3 is sealed with an encapsulating layer made of crosslinked polymer in that, in a single treatment stage, the tension-member system 3 is wetted with a complete treatment mixture comprising at least one prepolymer, at least one crosslinking agent, and at least one solvent or dispersion medium, and the treated tension-member system 3 is then dried.

In the period during which the complete treatment mixture penetrates into the cavities in the tension-member system and forms an encapsulating layer around the tension-member system, onset of crosslinking already takes place to an extent permitted by the conditions (for example, concentration and temperature); further crosslinking (completion of crosslinking) mostly takes place during the course of the subsequent drying procedure.

In an upstream stage of belt manufacture in process variant II, cavities in the tension-member system 3 are at least to some extent filled with crosslinked polymer, and the tension-member system 3 is sealed with an encapsulating layer made of crosslinked polymer in that, in at least two treatment stages, the tension-member system 3 is wetted with a complete treatment mixture comprising at least one prepolymer, at least one crosslinking agent, and at least one solvent or dispersion medium, and the treated tension-member system 3 is then dried.

The following embodiments are advantageous/preferred for process variant II with at least two treatment stages:

The complete treatment mixture used in each treatment stage can be identical.

It is particularly advantageous to use a different complete treatment mixture in each treatment stage. The prepolymer and/or the crosslinking agent can differ. Further optimization of wetting can be achieved by using different treatment mixtures. This process variant can particularly achieve a further increase in the degree of filling, in the event that this cannot be achieved by means of solvent concentrations. Other complete treatment mixtures here also comprise complete treatment mixtures which comprise a polyurethane prepolymer, but where the polyurethane prepolymers are different in each treatment mixture. As explained in more detail below, it is possible to produce different polyurethane prepolymers by selecting different starting components (polyols, polyisocyanates).

It is moreover possible to carry out a drying procedure between each treatment stage.

In respect of the crosslinking reaction during the filling procedure, during formation of the encapsulating layer, and during the drying procedure, reference is made to process variant I; in the case of process variant II it is also possible that formation of the encapsulating layer is delayed until the final treatment stage, or that the final treatment stage merely comprises thickening of the encapsulating layer that has already formed.

Whereas in the case of process variant I the tension-member system is wetted with the complete treatment mixture only in one treatment stage, in the case of process variant II the tension-member system is wetted with an identical or a different complete treatment mixture in each of the at least two treatment stages. The statements below relating to a treatment stage or to the complete treatment mixture used therein therefore relate not only to the single treatment stage in process variant I but also to each treatment stage of the at least two treatment stages in process variant II; as stated, process variant II can use identical or different complete treatment mixtures.

The reaction (crosslinking) takes place during the drying procedure, and the reaction can therefore have been substantially completed, for example to an extent of more than 90%, before the tension-member system is installed in the belt. The final completion of the reaction is usually delayed until embedment into the main belt structure. This gives better bonding of the tension-member system to the main belt structure.

The following process features are advantageous in process variants I and II:

It is preferable to use a polyurethane prepolymer as prepolymer. Polyurethane prepolymers are known to the person skilled in the art and are obtainable commercially. They can be formed via reaction of polyols with polyisocyanates, in particular diisocyanates. Polyols are compounds having at least two hydroxy groups. Polyisocyanates are compounds having at least two isocyanate groups. Polyurethane prepolymers with different properties can be obtained as required via the selection of the polyols and polyisocyanates used.

Examples of polyols and polyisocyanates, in particular diisocyanates, and polyurethane prepolymers formed therefrom are described by way of example in United States patent application publication 2011/0129647, hereby incorporated herein by way of reference. The polyurethane prepolymers can by way of example be formed from polyols selected from polyester polyols, polycarbonate polyols, and polyether polyols, and from diisocyanates such as paraphenylene diisocyanate and methylenediphenyl 4,4'-diisocyanate.

Crosslinking agents for prepolymers are known to the person skilled in the art, and also include chain extenders. The crosslinking agent crosslinks the prepolymers, chain extension also being included here; this leads to curing.

It is preferable that the crosslinking agent for the prepolymer, in particular for the polyurethane prepolymer, is a diol, in particular a butanediol, particularly 1,4-butanediol. Diols are advantageous because they are less reactive than other known crosslinking agents, for example polyamines, in particular diamines, or water, to isocyanate compounds, and better adjustment of the complete treatment mixture can therefore be achieved, for example, in respect of the desired prepolymer concentration, or of the viscosity. When water is used as crosslinking agent the $CO_2$ liberated during the reaction can also be problematic.

The solvent or dispersion medium used is in particular an inert solvent or dispersion medium, that is, one which does not react with the other components of the complete treatment mixture. It is possible to use any of the conventional organic solvents or dispersion media, or a mixture thereof. Examples that may be mentioned are toluene, xylenes, tetrahydrofuran, dimethylformamide, acetone, and methyl ethyl ketone.

In one preferred embodiment, the individual components of the complete treatment mixture, that is, the prepolymer and the crosslinking agent, are respectively first mutually independently dissolved or dispersed in a solvent or dispersion medium which can be identical (for example, toluene) or different (for example, toluene and xylene); these are then mixed before, preferably immediately before, the start of the treatment of the tension-member system, with formation of a complete treatment mixture, the viscosity of which remains low.

The complete treatment mixture is therefore preferably a low-viscosity mixture when it is used for the wetting of the tension-member system. It can therefore penetrate via capillary action into the fiber bundle of the tension-member system to uniform depth, and encapsulate the tension-member system. This ensures that every filament in the cross section of the tension-member system is wetted; a high degree of filling of the cavities is achieved, and the encapsulating layer is formed. The chemical reaction of the components is moreover inhibited by the solvent and, respectively, dispersion medium; this also allows good control of viscosity. The actual reaction mostly starts during the subsequent drying process with evaporation of the solvent or dispersion medium.

Suitable tension-member systems are by way of example any of the strands or twisted/braided strands which are known in the art and which are made of fibers or filaments, in particular tension-member systems composed of a cord structure (cords). The tension-member systems have cavities in the interior. Preference is given to tension-member systems made of a fibrous material. The fibrous material is preferably an electrically conductive material. From the fibers it is possible to form filaments, which are also termed fiber filaments. The tension-member systems can be composed of strands or twisted/braided strands made of fibers or filaments, and/or of a group of twisted/braided strands made of fibers or filaments, these being generally termed cords. The structure of the twisted/braided strands and of the cords is explained in more detail below with reference to FIG. 2. The information provided in that section is entirely generally applicable.

Preference is generally given to tension-member systems composed of a cord structure. However, there are also known tension-member systems, for example tension-member systems made of carbon fibers, which do not usually involve the traditional cord structure. They can by way of example be composed of strands or twisted/braided strands made of the fibrous material. The term cords is likewise used for these here, as conventional in the art. However, tension-member systems made of carbon fibers can also have traditional cord structures.

Examples are conventional cords and, respectively, tension-member systems in which the fibers or filaments are composed of steel, polyamide (PA), aramid, polyester, carbon, basalt, polyetheretherketone (PEEK), polyethylene terephthalate (PET), polybenzoxazole (P30), or polyethylene 2,6-naphthalate (PEN).

The tension-member systems can also be hybrid tension-member systems. Hybrid tension-member systems are composed of fibers or filaments made of at least two different materials, for example, the abovementioned materials, where the proportion of each material can be by way of example from 1 to 99% by weight. One advantageous embodiment has higher-modulus fibers inside within the core and lower-modulus fibers outside. Tension-member systems made of carbon fibers in the core and glass fibers as sheath are a typical example.

Preference is given in the invention to tension-member systems made of carbon fibers, glass fibers, aramid fibers, or basalt fibers, and to hybrid tension-member systems made of at least two of these fibers. Aramid fibers that can be used are para-aramid, para-aramid copolymers, and meta-aramid. Particularly important tension-member systems are those made of carbon fibers, and hybrid tension-member systems made of carbon fibers and fibers of at least one other material.

A conventional method can be used to wet the tension-member system with the complete treatment mixture, an example being spraying, spreading, or immersion; it is preferable to wet the tension-member system by immersing the tension-member system into the complete treatment mixture.

The penetration depth and quantity of the fill material, and the formation of the encapsulating layer, can moreover be influenced by way of example via the following parameters: viscosity of the complete treatment mixture; mixing ratio of solvent/dispersion medium to the components (prepolymer and crosslinking agent); temperature; pressure; residence time; number of treatment stages (immersion passes) in the case of process variant II. The features below are advantageous for achieving a high degree of filling and for the formation of the encapsulating layer, and can be used individually or else in combination with one another, and apply to process variant I and to each treatment stage in the case of process variant II, unless otherwise stated.

The proportion of solvent or dispersion medium in the complete treatment mixture, based on the entire quantity of solvent or dispersion medium, prepolymer, and crosslinking agent, is by way of example in the range from 1 to 90% by weight, more preferably in the range from 20 to 60% by weight, for process variant I, and in the range from 1 to 90% by weight, more preferably in the range from 30 to 70% by weight, for process variant II.

The viscosity of the complete treatment mixture used for the wetting of the tension-member system is by way of example preferably in the range from 1 mPas to 1000 mPas, with preference from 5 to 150 mPas, for process variant I, and in the range from 1 mPas to 1000 mPas, preferably from 20 to 500 mPas, for process variant II. Viscosity is determined at a temperature of 20° C. in accordance with ASTM D445.

The treated tension-member system can be dried at ambient temperature. However, it is preferable that the treated tension-member system is dried at an elevated temperature which by way of example is identical to or higher than the boiling point of the solvent or dispersion medium in the complete treatment mixture, preferably at least 5° C. higher, for example, 20° C. higher. The drying procedure can by way of example be carried out at a temperature in the range from 80° C. to 300° C., preferably from 120 to 250° C.

The wetting and/or drying procedure can be carried out at negative pressure, at superatmospheric pressure or ambient pressure, for example at a gauge pressure of from 0 to 100 bar, preferably from 0 to 1 bar, for example, at ambient pressure.

The residence time of the tension-member system at the elevated temperature for the drying procedure can vary as a function of many other factors, for example, tunnel length, running speed, pot life, and temperature. The residence time can by way of example be in the range from 0 to 6000 s or from 0.1 s to 6000 s, preferably from 30 to 300 s. A residence time of 0 s means a drying procedure at ambient temperature, but this is generally not preferred.

The number of treatment stages (for example, immersion passes) in process variant II can by way of example be from 2 to 5, preferably 2 or 3.

When the tension-member system is wetted in the process of the invention, filling of the cavities in the tension-member system with the crosslinked polymer, in particular with the crosslinked polyurethane, takes place at least to some extent. It is preferable that the degree of filling is high, where this refers to the degree of filling after implementation of all treatment stages and subsequent drying.

It is therefore preferable that, after drying of the treated tension-member system, at least 80%, preferably at least 90%, of the cavities in the tension-member system have been filled with the crosslinked polymer, preferably the crosslinked polyurethane. It is particularly preferable to achieve complete, or in essence complete filling of the cavities in the tension-member system, for example to achieve a degree of filling of about 100%.

The upstream process stage moreover seals the tension-member system with an encapsulating layer made of the crosslinked polymer, preferably made of a crosslinked polyurethane. This coating covers the surface of the tension-member system. The thickness of the encapsulating layer obtained after the drying procedure, preferably made of a crosslinked polyurethane, is by way of example no more than 1 mm, preferably no more than 0.1 mm. It is preferable that the thickness of the encapsulating layer, with preference made of a crosslinked polyurethane, is at least 5 µm.

Process variant II is preferred for the production of the treated tension-member system, in particular when the intended degree of filling of the cavities is high or almost 100%.

Manufacture of the belt is then undertaken with the tension-member system treated by the two process variants I and II. For this, the tension-member system treated in the upstream process stage is embedded into the polymeric material of the main belt structure. The belt is manufactured in a well-known manner; by way of example, reference may be made to the belt-technology prior art cited in the introduction.

The main belt structure itself is made of a polymeric material with elastic properties, for example, elastomers or thermoplastic elastomers. The polymeric material of the main belt structure can comprise mixture ingredients. Preferred polymeric materials are elastomers based on a crosslinked rubber mixture, where the rubber mixture comprises at least one rubber component and one or more mixture ingredients. For examples of suitable rubber components reference can be made to the examples mentioned in the introduction. The mixture ingredients comprise at least one crosslinking agent or one crosslinking agent system (crosslinking agent and accelerator). The rubber component is preferably a polyurethane.

Other possible optional mixture ingredients are one or more ingredients selected from fillers, processing aids, plasticizers, ageing inhibitors, and optionally other additional materials, for example fibers for reinforcement purposes, and color pigments. These other mixture ingredients are also suitable for main-belt-structure mixtures which comprise a thermoplastic elastomer.

The main belt structure is therefore preferably made of a polyurethane, where the polyurethane can be an elastomer or a thermoplastic elastomer. The main belt structure can preferably be based on a material made of a crosslinked polyurethane, the composition of which however can differ from that of the polyurethane for the tension-member-system treatment.

The embedment of the tension-member system treated in the upstream process stage into the polymeric material of the main belt structure can be achieved by way of example via extrusion or casting. Preference is given to casting with a casting composition which comprises the polymeric material of, or starting components of the polymeric material of, the main belt structure.

It is possible by way of example to use a mixture which comprises thermoplastic elastomer and optionally other mixture ingredients as stated above. This mixture can be converted by heating into a melt into which the tension-member system is embedded, for example, via extrusion or casting. The belt can be obtained after cooling.

It is preferable that a casting composition is used for the embedding of the tension-member system treated in the upstream process stage into the polymeric material of the main belt structure. The casting composition comprises at least one rubber component, preferably a polyurethane prepolymer, and a crosslinking agent, or a crosslinking agent system, as starting components of the polymeric material, and optionally other mixture ingredients. The tension-member system is embedded into the casting composition. The belt is obtained after hardening.

The resultant belt can be subjected to other conventional procedures: by way of example the force-transmission zone can be subjected to the conventional procedure described in the introduction.

The belt can be used as force-transmission belt, for example, in the form of a toothed belt, examples being extruded toothed belts, transport belt, flat belt, V-belt, V-ribbed belt, or composite cable.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
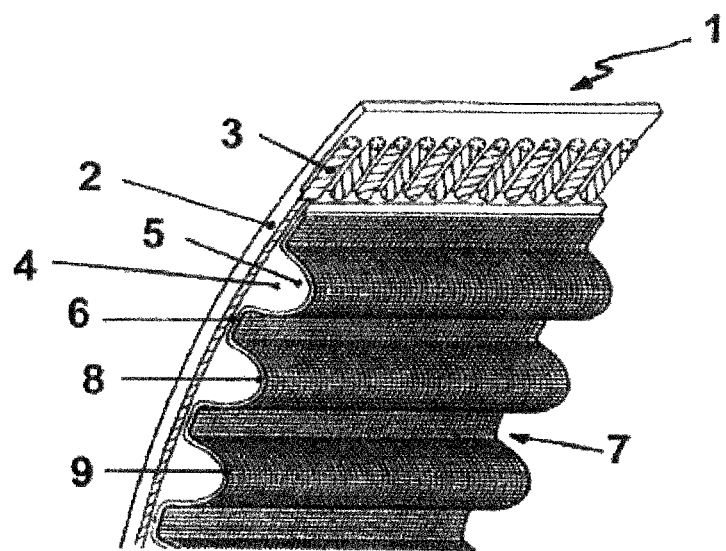
FIG. 1 shows a toothed belt with a tension-member system PU-treated by process variant I or II (fill material and encapsulating layer not shown); and, FIG. 2 shows a twisted/braided strand composed of filaments as basis of a cord structure.

FIG. 1 shows a belt 1 in the form of a toothed belt with an outer layer 2 as belt backing, an embedded tension-member system 3 with a plurality of tension members running parallel in the longitudinal direction of the belt, and also a substructure 4. The substructure has a toothed profile comprising teeth 5 and areas 6 between the teeth, and comprises the force-transmission zone 7.

The outer layer 2 and the substructure 4 here form, as entirety, the main belt structure made of a polymeric material with elastic properties. In respect of the preferred materials on which this is based, reference is made to the introduction of the description in relation to the prior art. The use of crosslinked polyurethane is of particular importance here.

The tension-member system 3 is in particular composed of carbon fibers, and the tension-member system here has been treated with a crosslinked polyurethane; this is described in more detail below in conjunction with FIG. 2.

The treatment can by way of example use the following complete treatment mixture:

Treatment mixture composed of:
46.9 g of Vibrathane® 8000 (from Chemtura Corporation, MDI-terminated polyester),
8.1 g of butanediol, and
45 g of tetrahydrofuran.

The force-transmission zone 7 of the belt is particularly susceptible to wear through abrasion, heat, and the effect of oils. For this reason the force-transmission zone is mostly provided with a textile overlay 8, for example in the form of a woven fabric. The textile overlay is by way of example, in accordance with the teaching of the document WO 2005/080821 A1, additionally impregnated with a fluorine-containing plastic, which in particular is polytetrafluoroethylene (PTFE), and specifically with a high degree of filling by the plastic, with simultaneous formation of a polymer coating (seal) as additional oil-resistant protective layer 9. The two sublayers 8 and 9, with different functions, appear here as combined protective layer.

The outer layer 2 of the belt 1 can also be provided with a textile overlay, for example of the type described above.

In its particular embodiment as toothed belt, the belt 1 is suitable by way of example for driving an oil pump of an engine, for example of an engine of a motor vehicle.

Figure 2:
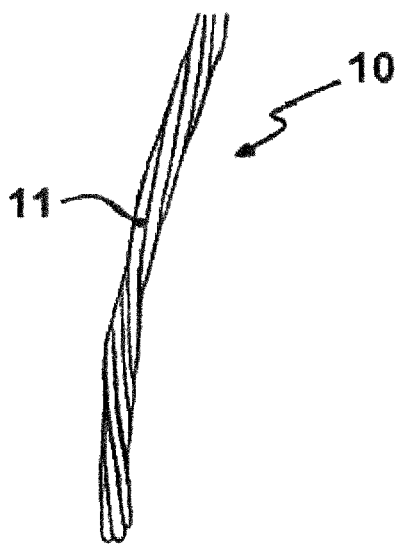

FIG. 2 shows a twisted/braided strand 10 composed of a group of filaments 11 where by way of example from 100 to 1000 filaments, in particular from 500 to 700 filaments, form a twisted/braided strand. The twisted/braided strand here mostly takes the form of a twisted strand, as is illustrated in FIG. 2. A group of twisted/braided strands finally forms the cord. A cord is mostly composed of at least five twisted/braided strands, in particular of from 10 to 20 twisted/braided strands. In the case of carbon fibers it is also possible, as mentioned, that the tension-member system is composed of only one strand or one twisted/braided strand.

The filaments 11 are composed of a fiber material, in particular of carbon fibers. Another term used in this context is fiber filaments.

The entire tension-member system structure or cord structure, comprising the entire system of fibers, filaments, and twisted/braided strands, includes cavities, specifically within the fibers, and also between the filaments and twisted/braided strands, and these are then at least to some extent filled with the crosslinked polyurethane in the context of the treatment. The tension-member system is also sealed with an encapsulating layer made of the crosslinked polyurethane. The fill material and the encapsulating layer provide firstly very good mechanical bonding to the fiber filaments, and thus to the tension-member system, and secondly very good chemical bonding to the main belt structure. Very good operating results are obtained with the resultant belt.

It is understood that the foregoing description is that of the preferred embodiments of the invention and that various changes and modifications may be made thereto without departing from the spirit and scope of the invention as defined in the appended claims.

KEY

Part of the Description

1 Belt in the form of a toothed belt
2 Outer layer in the form of belt backing
3 Tension-member system
4 Substructure
5 Tooth
6 Area between teeth
7 Force-transmission zone
8 Textile overlay (tooth overlay)
9 Protective layer
10 Twisted/braided strand
11 Filament

What is claimed is:

1. A process for the manufacture of a belt with upstream treatment of a tension-member system, the process comprising:
performing an upstream treatment by:
wetting a tension-member system with a first complete treatment mixture including at least one prepolymer, at least one crosslinking agent, and at least one solvent or dispersion medium;
filling cavities in the tension-member system at least to some extent with the first complete treatment mixture;
sealing the tension-member system with an encapsulating layer to make an encapsulated tension-member system; and,
drying the encapsulated tension-member system to prepare an at least partially crosslinked polymer and to complete the upstream treatment;
forming a substructure of a belt having a force-transmission zone by embedding the encapsulated tension-member system in a polymeric material with elastic properties; and,
forming a main belt structure by providing an outer layer as belt backing on the substructure having the force-transmission zone;
wherein the wetting of the tension-member system is carried out in a single treatment stage or is carried out in at least two treatment stages.

2. The process as claimed in claim 1, wherein at least two treatment stages are carried out, and
wherein a second treatment stage or a subsequent treatment stage uses the first complete treatment mixture or uses a complete treatment mixture different from the first complete treatment mixture.

3. The process as claimed in claim 1, wherein at least two treatment stages are carried out, and
wherein a drying procedure is carried out between each treatment stage.

4. The process as claimed in claim 1, wherein a diol is used as crosslinking agent.

5. The process as claimed in claim 1, wherein the prepolymer is a polyurethane prepolymer.

6. The process as claimed in claim 1, wherein the first complete treatment mixture is produced by mixing a prepolymer mixture which comprises the prepolymer dissolved or dispersed in a solvent or dispersion medium with a crosslinking agent mixture which comprises the crosslinking agent dissolved or dispersed in the solvent or dispersion medium, where the solvent or dispersion medium for the prepolymer mixture and for the crosslinking agent mixture is identical or different.

7. The process as claimed in claim 1, wherein the tension-member system is made of a fibrous material.

8. The process as claimed in claim 7, wherein the fibrous material of the tension-member system is selected from the group consisting of carbon fibers, glass fibers, aramid fibers, and basalt fibers, or the tension-member system is a hybrid tension-member system including at least two fibrous materials selected from the group consisting of carbon fibers, glass fibers, aramid fibers, and basalt fibers.

9. The process as claimed in claim 1, wherein the tension-member system has a cord structure.

10. The process as claimed in claim 1, wherein a proportion of solvent or dispersion medium in the first complete treatment mixture, based on the total quantity of solvent or dispersion medium, prepolymer, and crosslinking agent in the first complete treatment mixture, is in the range from 1 to 90% by weight.

11. The process as claimed in claim 1, wherein the polymeric material of the main belt structure is the same as the encapsulating layer of the tension-member system.

12. The process as claimed in claim 1, wherein the encapsulating layer is made of a crosslinked polyurethane.

13. The process as claimed in claim 1, wherein the main belt structure is made of a crosslinked polyurethane.

14. The process as claimed in claim 1, wherein the belt is a belt for drive engineering.

15. The process as claimed in claim 4, wherein the diol is a butanediol.

16. The process as claimed in claim 1, wherein the tension-member system includes an electrically conductive fibrous material.

17. The process as claimed in claim 8, wherein the tension-member system is made of carbon fibers, or the tension-member system is the hybrid tension-member system made of carbon fibers and at least one other fibrous material.

18. The process as claimed in claim 14, wherein the belt is a toothed belt, a transport belt, or a V-ribbed belt.

* * * * *